(12) United States Patent
Raymond et al.

(10) Patent No.: US 8,513,376 B2
(45) Date of Patent: Aug. 20, 2013

(54) POLYAMIDES AND AMIDOAMINES FROM SELECTIVELY MODIFIED AMINE AMINES

(75) Inventors: Williams Rene Edouard Raymond, New Tripoli, PA (US); David Alan Dubowik, Allentown, PA (US); Gamini Ananda Vedage, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 169 days.

(21) Appl. No.: 13/047,854

(22) Filed: Mar. 15, 2011

(65) Prior Publication Data

US 2012/0237774 A1   Sep. 20, 2012

(51) Int. Cl.
*C08Q 69/02*   (2006.01)

(52) U.S. Cl.
USPC ........ 528/340; 523/404; 523/417; 525/420.5; 525/423; 528/310

(58) Field of Classification Search
USPC .............. 525/423, 420, 420.5; 528/310, 340; 523/404, 417
See application file for complete search history.

(56) References Cited

U.S. PATENT DOCUMENTS

| | | | | |
|---|---|---|---|---|
| 2,705,223 | A | 3/1955 | Renfrew et al. | |
| 3,519,582 | A | 7/1970 | Clelford et al. | |
| 4,463,157 | A | 7/1984 | Kersten et al. | |
| 5,948,881 | A | 9/1999 | Shah et al. | |
| 7,473,806 | B2 | 1/2009 | Echigo et al. | |
| 7,655,736 | B2 * | 2/2010 | Vedage et al. | 525/420.5 |
| 8,293,863 | B2 * | 10/2012 | Vedage et al. | 528/340 |
| 2008/0188591 | A1 * | 8/2008 | Raymond et al. | 523/416 |
| 2008/0227928 | A1 * | 9/2008 | Vedage et al. | 525/423 |

FOREIGN PATENT DOCUMENTS

| EP | 0 134 970 A1 | 3/1985 |
|---|---|---|
| GB | 2 031 431 A | 4/1980 |

OTHER PUBLICATIONS

T.E. Breuer, "Dimer Acids", in J.I. Kroschwitz (ed.), Kirk-Othmer Encyclopedia of Chemical Technology, 4th Edition, Wiley, NY, 1993, vol. 8, pp. 223-237.
Y. Tanaka, "Synthesis and Characteristics of Epoxides", in C.A. May, ed., Epoxy Resins Chemistry and Technology (Marcel Dekker, 1988).
H. Lee, et al., Handbook of Epoxy Resins, McGraw-Hill, NY 1967.
D.F. Cadogan, et al., "Plasticizers", in J.I. Kroschwitz, ed., Kirk-Othmer Encyclopedia of Chemical Technology, 4th Ed., Wiley, NY, 1996, vol. 19, pp. 258-290.

* cited by examiner

*Primary Examiner* — Gregory Listvoyb
(74) *Attorney, Agent, or Firm* — Michael K. Boyer

(57) ABSTRACT

The present disclosure provides polyamides and amidoamine curing agents including the reaction product of (1) a modified amine component comprising at least one multifunctional amine of structure 1:

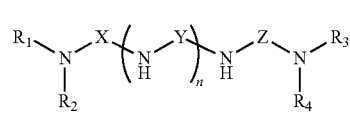

wherein $R_1$ is selected from $C_1$-$C_{16}$ linear, cyclic, and branched alkyl, alkenyl, and alkaryl groups; $R_2$ and $R_4$ are hydrogen, $R_3$ is $R_1$ or hydrogen, X, Y, and Z are independently selected from $C_2$-$C_{10}$ alkylene, hexylene and cycloalkylene groups, n=0, 1, 2, 3, 4, 5, 6, or 7; and (2) a fatty acid component. Exemplary fatty acid components include at least one of monomer fatty acids, dimer fatty acids, trimer fatty acids, polymer fatty acids, esters of monomer, dimer, trimer, and polymer fatty acids and combinations thereof. The method for making the curing agents and articles formed therefrom are also disclosed.

28 Claims, No Drawings

POLYAMIDES AND AMIDOAMINES FROM SELECTIVELY MODIFIED AMINE AMINES

BACKGROUND OF THE INVENTION

The present disclosure is directed to a composition and a method for forming polyamides and amidoamines from selectively modified amines. More specifically, the present disclosure is directed to polyamide curing agent compositions formed from selectively modified amines and epoxyamine compositions.

Polyamide curing agents are utilized extensively in many markets for epoxy curing agents including coatings, adhesives, composites, and flooring applications. Polyamide curing agents are comprised of the reaction products of dimerized fatty acid (dimer acid) and polyethyleneamines, and usually a certain amount of monomeric fatty acid which helps to control molecular weight and viscosity. "Dimerized" or "dimer" or "polymerized" fatty acid refers, generally, to polymerized acids obtained from unsaturated fatty acids. They are described more fully in T. E. Breuer, 'Dimer Acids', in J. I. Kroschwitz (ed.), *Kirk-Othmer Encyclopedia of Chemical Technology*, 4$^{th}$ Ed., Wiley, New York, 1993, Vol. 8, pp. 223-237.

Dimer acid is typically prepared by the acid catalyzed oligomerization under pressure of certain monomeric unsaturated fatty acids, usually tall oil fatty acid (TOFA), though sometimes other vegetable acids such as soya acid or cotton acid are substituted. Commercial products generally consist of mostly (>70%) dimeric species, with the rest consisting mostly of trimers and higher oligomers, along with small amounts (generally less than 5%) of monomeric fatty acids. Common monofunctional unsaturated $C_{16}$ to $C_{22}$ fatty acids also employed in making polyamides include tall oil fatty acid (TOFA) or soya fatty acid or the like.

U.S. Pat. No. 3,519,582, which is hereby incorporated by reference in its entirety, discloses benzylated TEPA based polyamide in example "Hardener E." U.S. Pat. No. 3,519,582 discloses that the benzylation is with benzyl chloride, which results in a non-selective benzylated amine. In addition, the benzylated product of the U.S. Pat. No. 3,519,582 includes undesirable byproducts containing chlorine that must be removed prior to subsequent use.

U.S. Pat. No. 7,473,806, which is hereby incorporated by reference in its entirety, discloses polyalkylene polyamines that are reacted with styrene. The resulting amines are benzylated and can be used to prepare some (poly) amido amines having properties suitable for use as an epoxy curing agent. However, the product of the U.S. Pat. No. 7,473,806 suffers from the drawback that the styrenated product was not heat stable and that a retro reaction takes place during the manufacture of a polyamide.

Several methods for preparation of (poly) amido polyamine and their use as curing agents for epoxy resins are known. For example, U.S. Pat. No. 2,705,223, which is hereby incorporated by reference in its entirety, describes epoxy resins cured with polyamides based on polymeric fatty acids and polyethyleneamines. European Patent Document EP 134,970, which is hereby incorporated by reference in its entirety, describes similar polyaminoamides. British Patent GB 2,031,431, which is hereby incorporated by reference in its entirety, discloses epoxy resins cured with mixtures of high molecular weight polyoxyalkylene polyamines and N,N'-bis(3-aminopropyl)ethylenediamine.

As a results of environmental regulations, and also as the need to reduce solvent levels in coatings has been perceived by coatings manufacturers and their customers, there has been a need to reduce the viscosity of the binders employed in coatings, and epoxy based coatings are no exception. However, in currently known products, as the viscosity decreases, it is generally found the amine hydrogen equivalent weight (AHEW) also decreases.

Epoxy resins are also available in many viscosities. A commonly employed epoxy resins are those based upon the diglycidyl ether of bisphenol-A (DGEBA), and higher molecular weight oligomers prepared by the advancement of the DGEBA with additional bisphenol-A. Such resins are usually difunctional or slightly less than difunctional, and characterized by their epoxy equivalent weight (EEW). Thus, bisphenol-A derived epoxy resin with an equivalent weight of 180 has a viscosity of about 8500 mPa·s (8500 cP). Slightly increasing the EEW to 190 increases the viscosity to about 12,000 mPa·s (12,000 cP). At an equivalent weight of 300 or so epoxy resins partially crystallize at a fairly rapid rate to a semi-solid and above an equivalent weight of about 400 they are solids, and thus their viscosities cannot be measured at room temperature.

In the formulation of coatings, it is frequently advantageous to employ higher molecular weight epoxy resins, such as those with equivalent weight of 450 to 550 (known in the industry as Type I resins). High molecular weight resins dramatically decrease the dry-to-touch time of the coating. Furthermore, higher molecular weight epoxy resins yield more flexible and impact resistant coatings than do lower molecular weight epoxy resins. Unfortunately, the high viscosity of the higher molecular weight epoxy resins requires the use of high levels of solvent in order to achieve a suitable application viscosity.

New regulations require reduced amounts of solvents in the formulation of the coatings as well as low emissions values during the life time of that coating. Local regulations in the U.S., Europe, Asia and elsewhere illustrate the desire that low viscosity is very important, where it is desirable to develop paints and coatings with <100 g/l VOC. Also lower viscosity means that the manufacturer can increase filler content of the system and thus decrease the cost of the coating formulation.

Improvements desired in the art of polyamide curing agents include low emissions, lower viscosity, little or no induction time, transparent mix with the epoxy resin that can be formed in an economical process that does not suffer from the drawbacks of the prior art. In addition, further desired features of the epoxy product include improved surface appearance, when applied under adverse conditions, good gloss and hardness development.

BRIEF SUMMARY OF THE INVENTION

The present disclosure includes polyamides and amidoamine curing agents. The polyamides and amidoamine curing agent include the reaction product of (1) a selectively modified amine component comprising at least one multifunctional amine of the following structure:

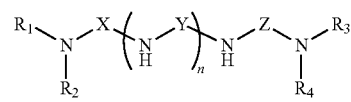

wherein $R_1$ is selected from $C_1$-$C_{16}$ linear, cyclic, and branched alkyl, alkenyl, and alkaryl groups; $R_2$ and $R_4$ are hydrogen, $R_3$ is $R_1$ or hydrogen, X, Y and Z are independently selected from $C_2$-$C_{10}$ alkylene, hexylene and cycloalkylene groups, n=0, 1, 2, 3, 4, 5, 6, or 7; and (2) a fatty acid component. Exemplary fatty acid components include at least one of monomer fatty acids, dimer fatty acids, trimer fatty acids, polymer fatty acids, esters of monomer, dimer, trimer, and polymer fatty acids and combinations thereof.

Another aspect of the disclosure includes a method for forming a polyamide curing agent composition. The method includes providing a selectively modified amine component comprising at least one multifunctional amine of the following structure:

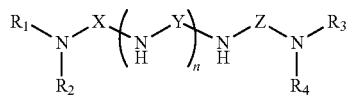

wherein $R_1$ is selected from $C_1$-$C_{16}$ linear, cyclic, and branched alkyl, alkenyl, and alkaryl groups; $R_2$ and $R_4$ are hydrogen, $R_3$ is $R_1$ or hydrogen, X, Y and Z are independently selected from $C_2$-$C_{10}$ alkylene, hexylene and cycloalkylene groups, n=0, 1, 2, 3, 4, 5, 6, or 7; providing a fatty acid component; and reacting the selectively modified amine component and the fatty acid component to form the polyamide curing agent. Exemplary fatty acid components include at least one of monomer fatty acids, dimer fatty acids, trimer fatty acids, polymer fatty acids, esters of monomer, dimer, trimer, and polymer fatty acids and combinations thereof.

Another aspect of the present disclosure includes an amine-epoxy composition comprising the reaction product of 1) a curing agent composition; and 2) an epoxy composition comprising at least one multi-functional epoxy resin. The curing agent composition includes the reaction product of (1) a selectively modified amine component comprising at least one multifunctional amine of the following structure:

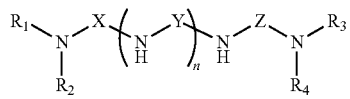

wherein $R_1$ is selected from $C_1$-$C_{16}$ linear, cyclic, and branched alkyl, alkenyl, and alkaryl groups; $R_2$ and $R_4$ are hydrogen, $R_3$ is $R_1$ or hydrogen, X, Y and Z are independently selected from $C_2$-$C_{10}$ alkylene, hexylene and cycloalkylene groups, n=0, 1, 2, 3, 4, 5, 6, or 7; and (2) a fatty acid component. Exemplary fatty acid components include at least one of monomer fatty acids, dimer fatty acids, trimer fatty acids, polymer fatty acids, esters of monomer, dimer, trimer, and polymer fatty acids and combinations thereof.

Other features and advantages of the present invention will be apparent from the following more detailed description of the preferred embodiment, which illustrates, by way of example, the principles of the invention.

DETAILED DESCRIPTION OF THE INVENTION

The present disclosure includes polyamide and amidoamine compositions of alkylated polyamines, methods for making polyamide, amidoamine compositions for use as curing agents. The present disclosure also includes polyamide and amidoamine cured epoxy compositions. Modified amines may be used with carboxylic acids to manufacture polyamide; polyamide have improved properties in comparison to existing amido amines and polyamides. In addition, the use of these products with the epoxy resins improve the properties of the cured resin, when compared to the same resin being reacted with non-modified polyamine reacted with similar (poly) carboxylic acid(s). The selectively modified amine may be formed from substitution reactions, such as, but not limited to, alkylation, benzylation and styrenation.

The curing agents of the present disclosure formed from alkylated polyamines include low viscosity, little or no induction time, transparent mix with the epoxy resin, better surface appearance, and longer pot lives. Exemplary pot lives include pot lives up to 3 days. Benefits of the alkylated amine also include a reduced induction time. Exemplary induction times include no induction time up to 60 minutes, or up to 30 minutes. In addition, polyamide curing agents according to an embodiment of the present disclosure have a lower viscosity than conventional polyamides, and can be used for engineering applications, filament winding, laminates and similar applications where a long pot life with low viscosity are required. Viscosity ranges for the curing agents according to the present disclosure include from about 50 Cp up to about 100,000 Cp or from about 50 Cp to about 3000 Cp. One particularly suitable range of viscosities is from about 50 Cp to about 300 Cp. Alkylated amine polyamides are particularly suitable for forming curing agents for large castings having slow cure, improve miscibility as the reaction occurs.

The curing agents of the present disclosure formed from benzylated polyamines include low viscosity, little or no maturation time, transparent mix with the epoxy resin, better appearance, and desirable gloss and Persoz. Exemplary compositions result in an epoxy having a clear (i.e., transparent) gloss with a glossy finish. Benefits of the benzylated amine also include a reduced or eliminated induction time. Exemplary induction times include no induction time up to 60 minutes, or up to 30 minutes. In addition, polyamide curing agents according to an embodiment of the present disclosure have a lower viscosity than conventional polyamides. Viscosity ranges for the curing agents according to the present disclosure include from about 50 Cp up to about 100,000 Cp or from about 50 Cp to about 3000 Cp. One particularly suitable range of viscosities is from about 50 Cp to about 300 Cp. In addition, the use of the polyamide curing agent according to the present disclosure in epoxy composition may produce a film with little or no carbamation/blushing. Other advantages include high gloss and also high Persoz hardness. Exemplary ranges for gloss include from about 100 to about 180 gloss units at 20° projection or from about 120 to about 180 gloss units at 20° projection. Exemplary Persoz hardness for the formed epoxy materials include hardness of 250 to 350 seconds or from about 300 to 350 seconds. Certain embodiment of exemplary amido amines may have long pot lives, for example, up to 8 hours. Still other embodiments of curing agents, due to their low viscosity, may be used at about 0% volatile organic carbon (VOC), with less than about 300 g/L solvent, less than about 100/L solvent or less than about 25 g/L solvent. The reduced or eliminated solvent content permits compliance with current and expected local regulations in the U.S., Europe, Asia and elsewhere. In addition, the low viscosity permits and increased number of charges, which permits a reduction is cost of the system. Benzylated amine polyamides are desirable for forming curing agents due to the high miscibility of the resultant curing agent with the resin. The high miscibility resulting from the use of benzylated amine polyamides is particularly suitable for coating applications such as primers, paints and the similar lower viscosity applications.

In addition, polyamides formed according to the present disclosure generally have shorter pot lives than amidoamines, which have pot lives that are greater. Longer pot lives are advantageous where lower exotherms are expected, particularly in the casting of electronical components that cannot sustained high heat, during their manufacture.

The following definitions and abbreviations are provided in order to aid those skilled in the art in understanding the detailed description of the present invention.

ADA—alkylenediamine, includes but is not limited to EDA and PDA
AHEW—amine hydrogen equivalent weight
APADA—aminopropylated alkylenediamine, includes but is not limited to APEDA and APPDA
APEDA—aminopropylated ethylenediamine
APPDA—aminopropylated propylenediamine
D230—poly(alkylene oxide) from Huntsman Corp
DETA—diethylenetriamine, AHEW=21
DGEBA—diglycidyl ether of bisphenol-A, EEW 182-192
DER™ 331—Liquid DGEBA
EDA—ethylenediamine
EEW—epoxy equivalent weight
EPIKOTE® 828 (EPON® 828)—liquid epoxy resin with EEW approximately 184-192
IPDA—isophoronediamine, AHEW=43
N3-N-3-aminopropyl ethylenediamine
N4-N,N'-bis(3-aminopropyl)ethylenediamine
N5-N,N,N'-tris(3-aminopropyl)ethylenediamine
N3-N5—mixture of N3, N4 and N5
PDA—propylenediamine
PEHA—pentaethylenehexamine
PHR—parts per hundred weight resin
TEPA—tetraethylenepentamine
TETA—triethylenetetramine, AHEW=25

"Dimerized" or "dimer" or "polymerized" fatty acid, as utilized herein, refers generally to polymerized acids obtained from unsaturated fatty acids. Common monofunctional unsaturated fatty acids used in making the dimer acid compositions include tall oil fatty acid (TOFA), soya fatty acid and cottonseed fatty acid.

Exemplary polyamide curing agent compositions are formed as reaction products of (1) a selectively modified amine component comprising at least one multifunctional amine of structure 1:

$$R_1\underset{R_2}{\overset{}{N}}-X-\left(\underset{H}{\overset{}{N}}-Y\right)_n\underset{H}{\overset{}{N}}-Z-\underset{R_4}{\overset{}{N}}-R_3 \quad 1$$

wherein $R_1$ is selected from $C_1$-$C_{16}$ linear, cyclic, and branched alkyl, alkenyl and alkaryl groups; $R_2$ and $R_4$ are hydrogen, $R_3$ is $R_1$ or hydrogen, X, Y and Z are independently selected from $C_2$-$C_{10}$ alkylene, hexylene and cycloalkylene groups, n=0, 1, 2, 3, 4, 5, 6, or 7; and (2) a fatty acid component.

The fatty acid component optionally contains a monofunctional fatty acid. In another embodiment n in the above formula is 1, 2, 3, or 4. In both of these aspects $R_1$ may preferably be alkyl, such as ethyl, isopropyl, cyclobenzyl or benzyl. The degree of modification for the selectively modified amine component is preferably greater than 1. For example, the degree of alkylation or benzylation is preferably greater than 1. Where X, Y and Z are alkylene groups of up to 10 carbons or preferably up to 6 carbons, hexylene groups or cycloalkylene groups. X, Y and Z can be the same or different. By "selectively modified" it is meant that the modification or substitution takes place on the primary amine. In another aspect, structure 1 includes $R_1$ having the formula $R_5H_2C$—, wherein $R_5$ is a moiety selected from the group consisting of an alkyl group, a phenyl group and a styrene group.

The polyamines are alkylated prior to reacting with a fatty acid component. For example, while not so limited, the polyamines may be benzylated at a ratio of between about 0.5:1 to about 2:1, but preferably between about 1.2:1 and about 1.3:1.

Higher polyethylene polyamines can be employed in the preparation of polyamide curing agents, such as diethylenetriamine (DETA), triethylenetetramine (TETA), tetraethylenepentamine (TEPA), pentaethylenehexamine (PEHA), hexaethyleneheptamine (HEHA). In one embodiment, the polyethylene polyamine employed is TETA.

An exemplary modified amine component includes at least one compound having a formula selected from:

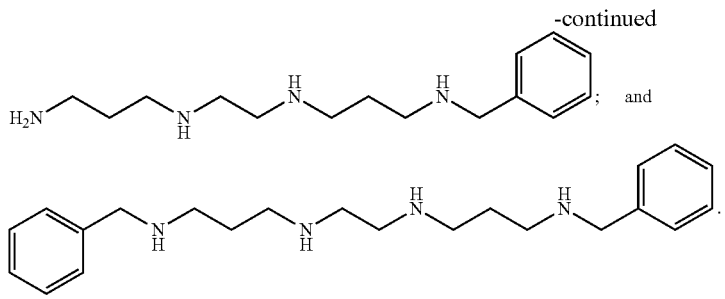

In one embodiment, the polyamine for forming the selectively modified amine is prepared by reacting a polyamine with a (poly) aldehyde or a (poly) ketone, this reaction is then followed a hydrogenation step to reduce the (poly) imine formed and to stop any reversible reaction. The polyamine for use with the present disclosure contains at least two amino groups wherein one amino group is a primary amino group and another amino group is a secondary amino group.

(Poly) aldehydes and (poly) ketones suitable for forming the polyamine for forming the selectively modified amine have the following general formula 2:

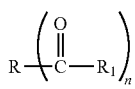

where R and $R_1$ are independently a hydrogen, an alkyl radical of up to 16 carbons of straight or branched chains with or without aromatic, cyclic or heterocyclic groups with or without unsaturation, —[CH(OH)]$_{3-4}$ or —[CH(OH)]$_{1-4}$—CH$_2$OH, and where n=1-2. In certain embodiments of the present disclosure, ketones used includes ketones such as, acetone, methyl ethyl ketone, methyl propyl ketone, diethyl ketone, methyl butyl ketone, methyl isobutyl ketone, methyl amyl ketone, methyl hexyl ketone, cyclohexanone, methyl cyclohexanone, isophorone, acetylacetone. Aldehydes used includes aldehydes such as methanal, ethanal, propanal, butanal, pentanal, 2-ethyl hexanal, benzaldehyde, 3-methoxy-4-hydroxy benzaldehyde (vanillal or vanillin), p-tolylaldehyde, anisaldehyde.

In an exemplary embodiment, the reactant for forming the alkylated polyamine is, but is not limited to, benzaldehyde, or other aromatic based aldehydes or ketones. In certain embodiments of the present disclosure, the polyamine used includes polyamines consisting of: an aliphatic polyamine such as diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine (N$_3$-Amine), N,N'-1,2-ethanediylbis-1,3-propanediamine (N$_4$-amine), or dipropylenetriamine; an arylaliphatic polyamine such as m-xylylenediamine (mXDA), or p-xylylenediamine; a cycloaliphatic polyamine such as 1,3-bisaminocyclohexylamine (1,3-BAC), isophorone diamine (IPDA), or 4,4'-methylenebiscyclohexanamine; an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis (3-aminopropyl)2,4,8,10-tetraoxaspiro (5,5)undecane; a polyalkoxypolyamine where the alkoxy group can be an oxyethylene, oxypropylene, oxy-1,2-butylene, oxy-1,4-butylene or co-polymers thereof such as 4,7-dioxadecane-1,10-diamine, 1-propanamine,3,3 (oxybis(2,1-ethanediyloxy))bis(diaminopropylated diethylene glycol ANCAMINE® 1922A), poly(oxy(methyl-1,2-ethanediyl)), alpha-(2-aminomethylethyl) omega-(2-aminomethylethoxy) (JEFFAMINE® D 230, D-400), triethyleneglycoldiamine and oligomers (JEFFAMINE® XTJ-504, JEFFAMINE® XTJ-512), poly(oxy(methyl-1,2-ethanediyl)), alpha,alpha'-(oxydi-2,1-ethanediyl)bis(omega-(aminomethylethoxy)) (JEFFAMINE® XTJ-511), bis(3-aminopropyl)polytetrahydrofuran 350, bis(3-aminopropyl)polytetrahydrofuran 750, poly(oxy(methyl-1,2-ethanediyl)), a-hydro-w-(2-aminomethylethoxy)ether with 2-ethyl-2-(hydroxymethyl)-1,3-propanediol (3:1) (JEFFAMINE® T-403), and diaminopropyl dipropylene glycol. JEFFAMINE® is a registered trademark of Huntsman Petrochemical LLC.

Particularly suitable polyamines include polyamines consisting of diethylenetriamine (DETA), triethylenetetramine (TETA), 1,3-bisaminocyclohexyl amine (1,3-BAC), isophoronediamine (IPDA), N-aminoethylpiperazine (NAEP), 4,7-dioxadecane-1,10-diamine,1-propanamine,3,3'-(oxybis(2,1-ethanediyloxy))bis-(ANCAMINE® 1922A), poly(oxy(methyl-1,2-ethanediyl)),alpha-(2-aminomethylethyl) omega-(2-aminomethylethoxy) (JEFFAMINE® D 230, D-400), triethylene glycol diamine (JEFFAMINE® XTJ-504), and poly(oxy(methyl-1,2-ethanediyl))alpha,alpha'-(oxy(di-2,1-ethanediyl))bis(omega-(aminomethylethoxy)). (JEFFAMINE® XTJ-511) or mixture thereof. ANCAMINE® is a registered trademark of Air Products And Chemicals, Inc.

Additional amines suitable for forming the selectively modified amine are polyamines comprising at least one or more multifunctional amine of structure 3.

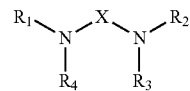

where $R_1$ is CH$_2$CH$_2$CH$_2$NH$_2$; $R_2$, $R_3$ and $R_4$ independently are H or CH$_2$CH$_2$CH$_2$NH$_2$; and X is CH$_2$CH$_2$ or CH$_2$CH$_2$CH$_2$. In one embodiment $R_2$ and $R_3$ are not H simultaneously. Exemplary products for forming the selectively modified amine include one or more of the following structures (I) through (IV):

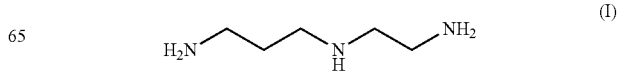

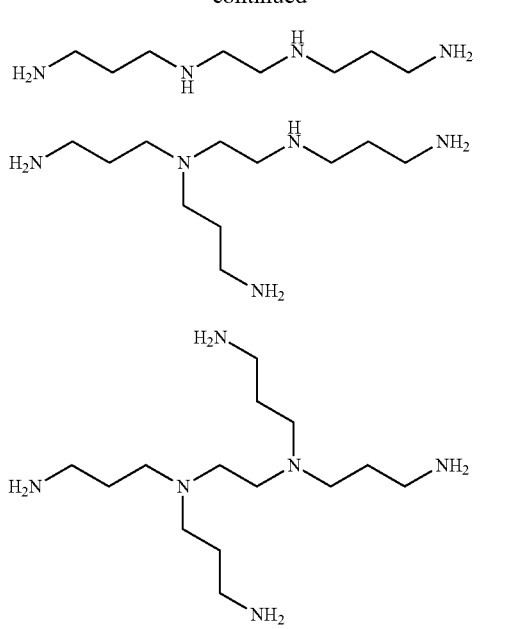

(II), (III), (IV)

The above amines can be mixed with other polyamines, particularly some polyethylene polyamines, before the modification is carried out.

In an exemplary embodiment, polyalkylenepolyamines are particularly suitable polyamines for general applications. The benzaldehyde and similar aromatic aldehydes are desirable alkylating agents for the preparation of polyamides/amidoamines curing agents.

In one embodiment, the fatty acid component for reaction with the selectively modified amine component to form the polyamide curing agent compositions according an exemplary embodiment are prepared by polymerizing fatty acids under pressure, and then removing the majority of the unreacted fatty mono-acids by distillation. The fatty acid component formed comprises mostly dimeric acids, but includes trimeric as well as some higher acids. The ratio of dimeric acids to trimeric and higher acids is variable, depending on processing conditions and the unsaturated acid feedstock. The dimer acid may also be further processed by, for example, hydrogenation, which reduces the degree of unsaturation and the color of the product.

Exemplary fatty acid component include dimer acids with a dimer content as measured by GC ranging from about 50 wt % to about 95 wt %, and a trimer and higher acid content of from about 3 wt % to about 40 wt %, the remainder being monomeric fatty acids. However, as the amount of trimer acid is increased, it may be necessary to increase the amount of polyamine and/or the amount of fatty mono-acid in order to maintain the desired viscosity of the final product, since the higher functionality of the trimeric and higher fatty acids will lead to more branching and increase the molecular weight in the product, and may even gel the product, as will be appreciated by those skilled in the art. Esters of dimer acids, particularly the $C_1$ to $C_4$ alkyl esters, can also be employed in embodiments of the present disclosure.

Suitable fatty acid components are those with a range of dimeric acids from 75 wt % to 90 wt %, including EMPOL® 1018, EMPOL® 1019, EMPOL® 1029 and EMPOL® 1022 (Cognis Corp.), HARIDIMER™ 250S (Harima M.I.D., Inc.), YONGLIN™ YLD-70 (Jiangsu Yonglin Chemical Oil Co.), and UNIDYME® 18 (Arizona Chemical Co.). EMPOL® is a registered trademark of Cognis Corporation. UNIDYME® is a registered trademark of Union Camp Corporation.

Exemplary fatty acid components suitable for use in combination with the dimer acids for forming the polyamide curing agent include $C_8$ to $C_{22}$, preferably $C_{16}$ to $C_{22}$ monocarboxylic acids containing from 0 to about 4 units of unsaturation. Exemplary fatty acid components include mixtures derived from triglycerides of natural products, such as babassu, castor, coconut, corn, cottonseed, grapeseed, hempseed, kapok, linseed, wild mustard, oiticica, olive, ouri-curi, palm, palm kernel, peanut, perilla, poppyseed, rapeseed, safflower, sesame, soybean, sugarcane, sunflower, tall, teaseed, tung, uchuba, or walnut oils. Pure fatty acids or mixtures of pure fatty acids, such as stearic, palmitic, oleic, linoleic, linolenic, etc. acids may also be employed, as can various esters of any of these fatty acids, particularly the $C_1$ to $C_4$ esters. Also of utility is isostearic acid, also known as monomer acid. Monomer acid is the mostly $C_{18}$ fatty mono-acid stream derived from the preparation of dimer acid.

In one embodiment, the fatty acids blended with the dimer acids are tall oil fatty acid and soya fatty acid. If desired, other monofunctional and multifunctional carboxylic acids may be incorporated into the dimer acid portion of the reaction composition.

In addition, other monofunctional or difunctional carboxylic acids of lower molecular weight or other multifunctional amines may be reacted with the modified amine component in order to provide specialized property enhancements. An exemplary property from using lower molecular weight (poly) acids, is a reduction of the HEW which will reduce the amount of the polyamide or of the amidoamine used to cure the epoxy, the use of non modified amines would also help to adjust the HEW, and also to reduce the cost of the system, as well as in some cases improving the chemical resistance, and the protection of substrates, such as steel.

The non modified amines suitable for addition include diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine ($N_3$-Amine), N,N'-1,2-ethanediyl-bis-1,3-propanediamine ($N_4$-amine), or dipropylenetriamine; an arylaliphatic polyamine such as m-xylylenediamine (mXDA), or p-xylylenediamine; a cycloaliphatic polyamine such as 1,3-bisaminocyclohexylamine (1,3-BAC), isophorone diamine (IPDA), or 4,4'-methylenebiscyclohexanamine; an aromatic polyamine such as m-phenylenediamine, diaminodiphenylmethane (DDM), or diaminodiphenylsulfone (DDS); a heterocyclic polyamine such as N-aminoethylpiperazine (NAEP), or 3,9-bis(3-aminopropyl)2,4,8,10-tetraoxaspiro (5,5)undecane; a polyalkoxypolyamine where the alkoxy group can be an oxyethylene, oxypropylene, oxy-1,2-butylene, oxy-1,4-butylene or co-polymers thereof such as 4,7-dioxadecane-1,10-diamine, 1-propanamine,3,3'-(oxybis (2,1-ethanediyloxy))bis(diaminopropylated diethylene glycol ANCAMINE® 1922A), poly(oxy(methyl-1,2-ethanediyl)), alpha-(2-aminomethylethyl)omega-(2-aminomethylethoxy) (JEFFAMINE® D 230, D-400), triethyleneglycoldiamine and oligomers (JEFFAMINE® XTJ-504, JEFFAMINE® XTJ-512), poly(oxy(methyl-1,2-ethanediyl)), alpha,alpha'-(oxydi-2,1-ethanediyl)bis(omega-(aminomethylethoxy)) (JEFFAMINE® XTJ-511), bis(3-aminopropyl)polytetrahydrofuran 350, bis(3-aminopropyl) polytetrahydrofuran 750, poly(oxy(methyl-1,2-ethanediyl)), a-hydro-w-(2-aminomethylethoxy)ether with 2-ethyl-2-(hydroxymethyl)-1,3-propanediol (3:1) (JEFFAMINE® T-403), and diaminopropyl dipropylene glycol.

Particularly suitable polyamines for use as the non-modified polyamines include polyamines consisting of diethylenetriamine (DETA), triethylenetetramine (TETA), 1,3-bisaminocyclohexylamine (1,3-BAC), isophoronediamine (IPDA), N-aminoethylpiperazine (NAEP), 4,7-dioxadecane-1,10-diamine,1-propanamine,3,3'-(oxybis(2,1-ethanediyloxy))bis-(ANCAMINE® 1922A), poly(oxy(methyl-1,2-ethanediyl)), alpha-(2-aminomethylethyl)omega-(2-aminomethylethoxy (JEFFAMINE® D 230, D-400), triethylene glycol diamine (JEFFAMINE® XTJ-504), and poly(oxy(methyl-1,2-ethanediyl))alpha,alpha'-(oxy(di-2,1-ethanediyl))bis (omega-(aminomethylethoxy)). (JEFFAMINE® XTJ-511) or mixture thereof.

Other embodiment include addition of modified amine components, such as benzylated or alkylated versions of the above amines in addition to the polyamide curing agent compositions.

Polyamides curing agents according to embodiments of the present disclosure are formed by a reaction under heat. In one embodiment, the selectively modified polyamine component and the fatty acid component are combined at temperatures ranging from about room temperature to about 100° C. A suitable ratio of reactants for the reaction include about a 1:1 ratio of fatty acid to selectively modified polyamine on a molecular basis. Other suitable ranges of ratios of fatty acid to selectively modified polyamine includes 1:1 to 2:1 on a molecular basis for monomeric fatty acids and 1:2 to 2:3 or 1:2 to 3:4 on a molecular basis for dimeric fatty acids. Heat is then supplied to raise the temperature as water is condensed from the reaction mixture. Heating is continued until the specified amount of water is removed that will yield a product with the desired amide and imidazoline or tetrahydropyrimidine content. Optionally, vacuum can be applied particularly in the late stages of the process to aid in the removal of water from the mixture. To reduce foaming, which can be a problem particularly under vacuum conditions, small amounts of defoamers may be added to the polyamide composition. Appropriate defoamers include various acrylic copolymers containing 2-ethylhexyl acrylate as part of the copolymer composition, various polysiloxane copolymers, and the like.

During the condensation reaction, it is possible to cause some of the amine functional amides to cyclize with further loss of water to form imidazoline or some tetrahydropyrimidines, as shown below for tetrahydropyrimidines.

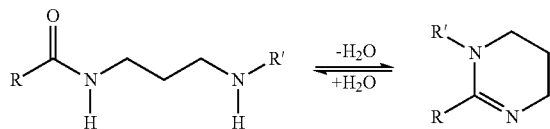

The reaction is continued until substantially all of the carboxylic acid groups are reacted. At that stage some imidazoline or tetrahydropyrimidine has formed, up to 5 mole %. Alkylation modification of the selectively modified polyamine results in a lower viscosity of the polyamide or amidoamine. In addition, generally, amido amines formed by the method of the present disclosure have a lower viscosity than the polyamides formed. In addition, the curing agent formed from the benzylated amido amines and polyamides have lower viscosities than the alkylated amines.

To form an epoxy product or article of manufacture, the polyamide curing agent, or hardener, formed from the reaction of modified amine component and the fatty acid component is combined with an epoxy resin which is a polyepoxy compound containing about 2 or more 1,2-epoxy groups per molecule. Such epoxides are described in Y. Tanaka, "Synthesis and Characteristics of Epoxides", in C. A. May, ed., Epoxy Resins Chemistry and Technology (Marcel Dekker, 1988), and are incorporated by reference. Such combination of polyamide curing agent and epoxy resin composes a curable epoxy system.

Particularly suitable polyepoxy compounds are the diglycidyl ethers of bisphenol-A, the advanced diglycidyl ethers of bisphenol-A, the diglycidyl ethers of bisphenol-F, and the epoxy novolac resins.

The reaction products from the reaction of selectively modified amine component and the fatty acid component according to embodiments of the present disclosure have a lower viscosity than the polyamide made with non benzylated amine. However some high viscosity polyamides can be thus formed. To reduce the viscosity of such formulation of polyamides of the current disclosure with a di- or multi-functional epoxy resin, the epoxy resin may be modified with a portion of monofunctional epoxide. In this way viscosity is further reduced, which may be advantageous in certain cases, such as for example to increase the level of pigment in a formulation while still allowing easy application, or to allow the use of a higher molecular weight epoxy resin. Examples of useful monoepoxides include styrene oxide, cyclohexene oxide and the glycidyl ethers of phenol, the cresols, tert-butylphenol and other alkyl phenols, butanol, 2-ethyl-hexanol and C8 to C14 alcohols and the like.

Exemplary polyamides of the current disclosure are formulated with epoxy resins at stoichiometric ratios of epoxy groups to amine hydrogen ranging from about 1.5 to 1 to about 1 to 1.5. More preferred are ranges from 1.2 to 1 to 1 to 1.2.

It is also possible to modify the polyamides of the current disclosure by reacting a modest portion of the amine hydrogen with difunctional and monofunctional epoxy resins such as those described above. This is a common practice well known to those skilled in the art, and generally referred to as "adduction". By adducting with difunctional and monofunctional epoxy resins it is possible to improve the compatibility of the polyamide with epoxy resin and thereby reduce problems such as blush, carbonation and exudation as described above, and to increase pot life. On the other hand, such modification tends to increase viscosity, particularly in the case of difunctional epoxy resins, and may in some cases also decrease the rate of cure. Particularly useful epoxy resins for adduction include the diglycidyl ethers of bisphenol-A, the advanced diglycidyl ethers of bisphenol-A, the diglycidyl ethers of bisphenol-F, styrene oxide, cyclohexene oxide and the glycidyl ethers of phenol, the cresols, tert-butylphenol and other alkyl phenols, butanol, 2-ethylhexanol, and $C_8$ to $C_{14}$ alcohols and the like. It is also possible to accomplish a modest level of adduction by mixing the amine and epoxy components and allowing them to stand for some period of time known as an induction period to those skilled in the art, normally 15 to 60 minutes, before application.

In some circumstances it may be advantageous to incorporate so-called accelerators for the epoxy-amine curing reaction in formulations based on polyamides of the current disclosure. Such accelerators are described in H. Lee and K. Neville, Handbook of Epoxy Resins, McGraw-Hill, New York, 1967. Suitable accelerators include various organic acids, alcohols, phenols, tertiary amines, hydroxylamines, and the like. Particularly useful accelerators include benzyl alcohol, phenol, alkyl substituted phenols such as nonylphenol, octylphenol, t-butylphenol, cresol and the like, bisphenol-A, salicylic acid, dimethylaminomethylphenol, bis(dimethylaminomethyl)phenol, and tris(dimethylaminomethyl) phenol. Normally, such accelerators are used at levels of 10% or less based on the total weight of binder, and more usually at levels of less than 5%.

In some circumstances it may be advantageous to incorporate plasticizers for the epoxy-amine network in formulations based on polyamides of the current disclosure. This is particularly useful in cases where, in the absence of such a plasticizer, the glass transition temperature, Tg, of the composition significantly exceeds the ambient temperature before the degree of reaction necessary to meet certain requirements such as solvent and chemical resistance and tensile strength has been achieved. Such plasticizers are well known to those skilled in the art, and are described more fully in D. F. Cadogan and C. J. Howick, 'Plasticizers', in J. I. Kroschwitz, ed., *Kirk-Othmer Encyclopedia of Chemical Technology*, 4th Ed., Wiley, New York, 1996, Vol. 19, pp. 258-290. Particularly useful plasticizers include benzyl alcohol, nonylphenol, and various esters of phthalic acid. The ester plasticizers would normally be incorporated in the same package as the epoxy resin to minimize reaction with the amine curing agent. Another particularly useful class of plasticizers is hydrocarbon resins, which include toluene-formaldehyde condensates such as EPODIL® L, xylene-formaldehyde condensates such as NIKANOL® Y50, coumarone-indene resins, and many other hydrocarbon resin modifiers well know to those skilled in the art. EPODIL® is a registered trademark of Air Products And Chemicals, Inc. NIKANOL® is a registered trademark of Mitsubishi Gas Chemical Company, Inc.

Coatings prepared from polyamides of the current disclosure and epoxy resins can be formulated with a wide variety of ingredients well known to those skilled in the art of coating formulation, including solvents, fillers, pigments, pigment dispersing agents, rheology modifiers, thixotropes, flow and leveling aids, defoamers, etc. Mixtures of solvents will frequently be chosen so as to give the best evaporation rate profile for the system while maintaining solubility of the binder components. Suitable solvents include aromatics, aliphatics, esters, ketones, ethers, alcohols, glycols, glycol ethers, and the like. Particularly useful in the formulation are some level of ketones such as acetone, methyl ethyl ketone, methyl isoamyl ketone, methyl propyl ketone, methyl amyl ketone, diacetone alcohol and the like, which can be used to improve pot life with little or no sacrifice in dry speed. If ester solvents are included in the formulation, it is usually necessary to formulate them in the package containing the epoxy resin, so as to minimize their reaction with the amine curing agent. Sometimes the epoxy resins used in the practice of this disclosure will be supplied in solvent cut versions, and likewise, it may be of value to use the polyamides of the current disclosure, or other curing agents used in combination with these polyamides, as solvent-cut versions.

Coatings of this disclosure can be applied by any number of techniques including spray, brush, roller, paint mitt, and the like. Numerous substrates are suitable for application of coatings of this disclosure with proper surface preparation, as is well understood in the art. Such substrates include but are not limited to many types of metal, particularly steel and aluminum, as well as concrete and ceramics.

Coatings of this disclosure can be applied and cured at ambient temperatures ranging from about 0° C. to about 50° C., with temperatures of 10° C. to 40° C. preferred. If desired, these coatings can also be force cured at temperatures up to 150° C. or more.

Multifunctional Epoxy Resin

Amine-epoxy compositions of the present disclosure comprise the reaction product of a curing agent composition and an epoxy composition comprising at least one multifunctional epoxy resin. Multifunctional epoxy resin, as used herein, describes compounds containing 2 or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference.

One class of epoxy resins suitable for use in the present disclosure comprises the glycidyl ethers of polyhydric phenols, including the glycidyl ethers of dihydric phenols. Illustrative examples include, but are not limited to, the glycidyl ethers of resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol F, and which may contain varying amounts of 2-hydroxyphenyl isomers), and the like, or any combination thereof. Additionally, advanced dihydric phenols of the following structure also are useful in the present disclosure:

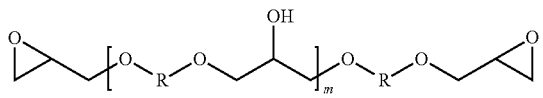

where m is an integer, and R is a divalent hydrocarbon radical of a dihydric phenol, such as those dihydric phenols listed above. Materials according to this formula can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used in coating formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the present disclosure. In another aspect the multifunctional epoxy resin has an EEW in a range from about 170 to about 250.

Depending upon the end-use application, it can be beneficial to reduce the viscosity of the compositions of the present disclosure by modifying the epoxy component. For example, the viscosity can be reduced to allow an increase in the level of pigment in a formulation or composition while still permitting easy application, or to allow the use of a higher molecular weight epoxy resin. Thus, it is within the scope of the present disclosure for the epoxy component, which comprises at least one multifunctional epoxy resin, to further comprise a monofunctional epoxide. Examples of monoepoxides include, but are not limited to, styrene oxide, cyclohexene oxide and the glycidyl ethers of phenol, cresols, tert-butylphenol, other alkyl phenols, butanol, 2-ethylhexanol, $C_4$ to $C_{14}$ alcohols, and the like, or combinations thereof. The multifunctional epoxy resin can also be present in a solution or emulsion, with the diluent being water, an organic solvent, or a mixture thereof.

Miscellaneous Additives

Compositions of the present disclosure can be used to produce various articles of manufacture. Depending on the requirements during the manufacturing of or for the end-use application of the article, various additives can be employed in the formulations and compositions to tailor specific properties. These additives include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof. It is understood that other mixtures or materials that are known in the art can be included in the compositions or formulations and are within the scope of the present disclosure.

Articles

The present disclosure also is directed to articles of manufacture comprising the compositions disclosed herein. For example, an article can comprise a amidoamine-epoxy composition which comprises the reaction product of a curing agent composition and an epoxy composition. The curing agent composition can comprise the contact product of at least one of the amidoamines having 2 or more active amine hydrogens. The said product can be further formulated with polyfunctional amines, catalysts; accelerators, reactive or non-reactive diluents. The epoxy composition can comprise at least one multifunctional epoxy resin. Optionally, various additives can be present in the compositions or formulations used to produce fabricated articles, dependent upon the desired properties. These additives can include, but are not limited to, solvents (including water), accelerators, plasticizers, fillers, fibers such as glass or carbon fibers, pigments, pigment dispersing agents, rheology modifiers, thixotropes, flow or leveling aids, surfactants, defoamers, biocides, or any combination thereof.

Articles in accordance with the present disclosure include, but are not limited to, a coating, an adhesive, a construction product, a flooring product, or a composite product. Coatings based on these amine-epoxy compositions can be solvent-free or can contain diluents, such as water or organic solvents, as needed for the particular application. Coatings can contain various types and levels of pigments for use in paint and primer applications. Amine-epoxy coating compositions comprise a layer having a thickness ranging from 40 to 400µ, preferably 80 to 300µ, more preferably 100 to 250µ, for use in a protective coating applied on to metal substrates In addition, for use in a flooring product or a construction product, coating compositions comprise a layer having a thickness ranging from 50 to 10,000µ, depending on the type of product and the required end-properties. A coating product that delivers limited mechanical and chemical resistances comprises a layer having a thickness ranging from 50 to 500µ, preferably 100 to 300µ; whereas a coating product such as for example a self-leveling floor that delivers high mechanical and chemical resistances comprises a layer having a thickness ranging from 1,000 to 10,000µ, preferably 1,500 to 5,000µ.

Numerous substrates are suitable for the application of coatings of this disclosure with proper surface preparation, as is well known to one of ordinary skill in the art. Such substrates include, but are not limited to, concrete and various types of metals and alloys, such as steel and aluminum. Coatings of the present disclosure are suitable for the painting or coating of large metal objects or cementitious substrates including ships, bridges, industrial plants and equipment, and floors.

Coatings of this disclosure can be applied by any number of techniques including spray, brush, roller, paint mitt, and the like. In order to apply very high solids content or 100% solids coatings of this disclosure, plural component spray application equipment can be used, in which the amine and epoxy components are mixed in the lines leading to the spray gun, in the spray gun itself, or by mixing the two components together as they leave the spray gun. Using this technique can alleviate limitations with regard to the pot life of the formulation, which typically decreases as both the amine reactivity and the solids content increases. Heated plural component equipment can be employed to reduce the viscosity of the components, thereby improving ease of application.

Construction and flooring applications include compositions comprising the amine-epoxy compositions of the present disclosure in combination with concrete or other materials commonly used in the construction industry. Applications of compositions of the present disclosure include, but are not limited to, its use as a primer, a deep penetrating primer, a coating, a curing compound, and/or a sealant for new or old concrete, such as referenced in ASTM C309-97, which is incorporated herein by reference. As a primer or a sealant, the amine-epoxy compositions of the present disclosure can be applied to surfaces to improve adhesive bonding prior to the application of a coating. As it pertains to concrete and cementitious application, a coating is an agent used for application on a surface to create a protective or decorative layer or a coat. Crack injection and crack filling products also can be prepared from the compositions disclosed herein. Amine-epoxy compositions of the present disclosure can be mixed with cementitious materials such as concrete mix to form polymer or modified cements, tile grouts, and the like. Non-limiting examples of composite products or articles comprising amine-epoxy compositions disclosed herein in glass fiber reinforced composites, and other molded products.

In a particular use of the disclosure these curing agent compositions will have applicability in making epoxy filament-wound tanks, infusion composites such as windmill blades, aerospace adhesives, industrial adhesives, electronic components as well as other related applications. A composite is a material made of different substances, and in the case of resin technologies, composites refer to resin impregnated systems where the resin is reinforced by the addition of reinforcing materials such as fillers and fibers for improving general properties of the resulting product. These materials work together but are not soluble in one another. In the present case, the binder component comprises the epoxy resin and epoxy curing agent(s). There are many types of composite applications such as prepregs, laminates, filament windings, braiding, pultrusion, wet lay and infusion composites. Resin infusion, or resin transfer, is a process by which resin is introduced to the composite mold, the reinforcement material having already been placed into the mold and closed prior to resin introduction. There are variations on this process such as those that are vacuum assisted.

An advantage of the use of amidoamines of selectively modified polyamines in amine-epoxy compositions for making composites is the longer pot life and improved compatibility versus the amidoamines from polyamines like TEPA. These product have a long pot life but they lack the good miscibility with the epoxy and require consequent induction times before the systems become clear. These products are workable for filament winding and infusion applications. Using the (poly) amido amines for filament winding (pipes) is a very manual process with significant EH&S concerns (when TETA and epoxy resin is mixed, then the workers take cups of the mixture from a dispenser and manually pour them over the winding glass fibers and run their gloved hands along the pipe to run the liquid onto the winding pipe). With longer pot life the process could be automated with a bath also the lower vapor pressure of the curing agent makes it safer to handle.

The advantage in adhesives is again longer pot life, in this case so there is no skin-over before the parts are glued together, which is a major concern for large aircraft and windmill blades, when it takes a long time to place the adhesive beads across the entire part. Lower blush due to the benzyl group adds to the lower skin-over. The low viscosity allows for high filler levels. If the adhesive that is put on the part first starts to cure or starts to blush over before the last of the adhesive is dispensed on the part, when the two pieces are pressed together there will be a weaker bond with the first bead.

EXAMPLES

The disclosure is further illustrated by the following examples, which are not to be construed as imposing limitations to the scope of this invention. Various other aspects, embodiment, modifications, and equivalents thereofwhich, after reading the description herein, may suggest themselves to one or ordinary skill in the art without departing from the spirit of the present invention or the scope of the appended claims.

In the following examples the polyamines are benzylated at a ratio of 1.2 and 1.3 to 1.0. This is not a limitation, other ratios can be used with good results.

Example 1

Synthesis of Mixture of N-3-aminopropyl ethylenediamine, N,N'-bis(3-aminopropyl)ethylenediamine, and N,N,N'-tris(3-aminopropyl)ethylenediamine Synthesis of the Intermediate To a 1 liter batch reactor was added 236 g (3.93 moles) of ethylenediamine and to that 5 g of water was added, and the contents were heated to 60° C. To this mixture 417 g (7.86 moles) of acrylonitrile was added over 5 hours. Once the acrylonitrile addition was completed the reactor temperature was maintained for an additional 1.5 hours.

Hydrogenation of the Intermediate

A 1 liter batch reactor was charged with 100 g of isopropanol, 6.6 g of water and 7.5 g of Raney Co catalyst. The reactor was pressure cycled first with nitrogen and then with hydrogen to remove traces of entrained air. After pressure cycling, the reactor was filled with 5.5 MPa hydrogen and then heated to 120° C. The 500 g of product from the previous step was the added to the reactor over 4 hours. During this time reactor pressure was maintained at 5.5 MPa by supplying hydrogen to it from a one liter ballast tank. Once the addition was over the temperature was maintained at 120° C. for an additional hour to make sure the hydrogenation was complete. The reactor was cooled down to room temperature, and the product was filtered. The product was analyzed by area percent GC and it contained 6% N-3-aminopropyl ethylenediamine, 80% N,N'-bis(3-aminopropyl)ethylenediamine, and 11% N,N,N'-tris(3-aminopropyl)ethylenediamine and 2% N,N,N',N'-tetrakis(3-aminopropyl) ethylenediamine. The product produced by the above method of Example 1 has been hereinafter designated as Example 1.

Example 2

Synthesis of Benzylated Example 1 at a Level of 1.3 Moles Benzaldehyde Per Mole of Amine (Average)

325 g of the polyalkylene product Example 1 from Example 1 (1.857 moles) and 6 g of Pd/C were placed in a 1 liter autoclave reactor. The reactor was sealed and subsequently purged with nitrogen and then with hydrogen to remove any air from the reactor. Over a time period of 15 to 20 minutes, 256 g of benzaldehyde (2.414 moles) were added to the reactor. After the addition of the benzaldehyde was complete, the reactor contents were stirred for an additional 15 minutes or until the reaction was complete, at which time the reaction exotherm began to subside. At this point the reactor was pressurized to 120 psi with hydrogen and the reactor was heated to 80° C. When the rate of hydrogen uptake slowed, the pressure was increased to 800 psi and the temperature was increased to 120° C. The hydrogenation process continued until the rate of hydrogen uptake fell below 0.034 MPa/min (0.5 psi/min). The total hydrogenation time was about 5 hours. The reactor was cooled down to 60° C. and depressurized; the reaction product was filtered to remove the catalyst. Water was removed using a rotary-evaporator operating under 20 mm Hg vacuum and temperatures up to 120° C. The resulting reaction product was a benzylated amine of Example 1, with AHEW, viscosity, amine value properties, as shown in Table 1.

Example 3

Synthesis of Benzylated DETA (Diethylentriamine) at a Level of 1.2 Moles Benzaldehyde Per Mole of Amine Example 3 utilized the same process as described in example 2, but with DETA as the polyalkylene component. The molar ratio of benzaldehyde to DETA was 1.2 to 1.0 moles/mole. These reactants ratios are indicated by the degree of benzylation in Table 1. Additionally Table 1 lists the AHEW, viscosity and amine value properties of the benzylated DETA.

Example 4

Synthesis of Benzylated TETA (Triethylenetetramine) at a Level of 1.3 Moles Benzaldehyde Per Mole of Amine (Average)

Example 4 utilized the same process as described in example 2, but with TETA as the polyalkylene component. The molar ratio of benzaldehyde to amine was 1.3 to 1.0 moles/mole. Additionally Table 1 lists the AHEW, viscosity and amine value properties of the benzylated DETA.

Example 5

Synthesis of Benzylated DETA/TETA (70% Diethylenetriamine and 30% Triethylenetetramine) at a Level of 1.3 Moles Benzaldehyde Per Mole of Amine (Average)

Example 5 utilized the same process as described in example 2, but with a mix of DETA and TETA as polyalkylene component. The molar ratio of benzaldehyde to amine was 1.3 to 1.0 moles/mole. Additionally Table 1 lists the AHEW, viscosity and amine value properties of the benzylated DETA.

TABLE 1

| Product | | Example 2 | Example 3 | Example 4 | Example 5 |
|---|---|---|---|---|---|
| Base amine. | | Example 1 | DETA | TETA | DETA/TETA |
| Degree of benzylation | | 1.3 | 1.2 | 1.3 | 1.3 |
| HEW | Calculated | 61 | 55.5 | 58 | 58.2 |
| Amine value | mgKOH/g | 641 | 800 | 807 | 794 |
| Viscosity at 25° C. | mPa · s | 123 | 23.6 | 118 | 31 |
| Color Gardner | | 3 | 3 | 2 | 3 |
| Average Molecular Wgt | Calculated | 287 | 211 | 273 | 233 |

In Examples 6-9 amido amines were prepared using the benzylated amines of Examples 2-5.

Example 6

Synthesis of Amido Amine by Reaction of Benzylated DETA with Tall Oil Fatty Acid 141.75 g (0.5 mole) TOFA (tall oil fatty acid) is charged in a 700 ml reactor fitted with stirrer, thermocouple and a distillation outlet. The TOFA is heated up to 60° C. 362.5 g of the benzylated DETA (1.718 moles) from example 3 are then added in 30 mins. During the addition an exotherm is observed which brings the temperature to 87° C. The speed of the stirrer is adjusted to 250 rpm, a slow nitrogen flow is allowed to help to remove the water more efficiently. The first water was removed at normal pressure, up to 240° C. First water collected came out at 181.7° C. pot temperature, with a stillhead temperature of 98.4° C. Temperature was then increased to 240° C. When that temperature had been reached it was kept 120 minutes thus. In that time 5.5 g water were collected. The product was cooled down to 200° C. The pressure was then lowered to 80 mmHg, and the temperature increased again to 240°. The product was held on at 240° C. for 120 minutes. By that time a total of 7.5 g water had been collected. Product was cooled down and discharged. The AHEW, viscosity, amine value and Gardner color are shown in table 2.

Example 7

Synthesis of Amido Amine by Reaction of Benzylated TETA with Tall Oil Fatty Acid Example 7 utilized the benzylated TETA from example 4. 255 g TOFA (0.892 mole) were charged with 410 g (1.559 moles) of benzylated TETA from Example 4. The same process was followed as in Example 6. A total of 13.5 g water was removed. The quantity used was to match the usual AHEW value of existing amido amine (ca 115). Additionally Table 2 lists the AHEW, viscosity, amine value properties and color Gardner of the amido amine.

Example 8

Synthesis of Amido Amine by Reaction of Benzylated Example 1 with Tall Oil Fatty Acid Example 8 utilized the benzylated Example 1 from example 2. 56.7 g TOFA (0.198 mole) were charged with 150 g (0.5226 mole) of benzylated Example 1 from example 2. The same process was followed as in Example 6. A total of 5.5 g water was removed. The quantity used was to match the AHEW value of existing amido amine (ca 95). Additionally Table 2 lists the AHEW, viscosity, amine value properties and color Gardner of the amido amine.

Example 9

Synthesis of Amido Amine by Reaction of Benzylated DETA/TETA (Ratio 70/30) with Tall Oil Fatty Acid (670,666)

Example 9 utilized the benzylated mix of DETA/TETA at a ratio 70/30 from example 5. 567 g TOFA (1.98 moles) were charged with 1450 g (6.502 mole) of benzylated DETA/TETA from example 5. The same process was followed as in Example 6. A total of 71.6 g water was removed. The quantity used was to match the AHEW value of existing amido amine (ca 90). Additionally Table 2 lists the AHEW, viscosity, amine value properties and color Gardner of the amido amine. Polyamides were also made using the same benzylated amine.

In Examples 10-13 polyaminoamides were prepared using the benzylated amines of Examples 2-5.

Example 10

Synthesis of Polyaminoamide by Reaction of Benzylated DETA with a Mixture of Dimeric Fatty Acid and Tall Oil Fatty Acid 18.0 g (0.063 mole) TOFA (Tall Oil Fatty Acid) and 162 g (0.283 mole) dimeric fatty acid are charged in a 700 ml reactor fitted with stirrer, thermocouple and a distillation outlet. The TOFA and dimeric fatty acid are heated up to 60° C. 265.9 g of the benzylated DETA (1.26 moles) from example 3 are then added in 30 mins. During the addition an exotherm is observed which brings the temperature to 88° C. The speed of the stirrer is adjusted to 250 rpm, a slow nitrogen flow is allowed to help to remove the water more efficiently. The first water was removed at normal pressure, up to 240° C. First water collected came out at 189° C. pot temperature, with a stillhead temperature of 88° C. Temperature was then increased to 240° C. When that temperature had been reached it was kept 120 minutes thus. In that time 21.3 g water were collected. Product was cooled down and discharged. The AHEW, viscosity, amine value and Gardner color are shown in table 2.

Example 11

Synthesis of Polyaminoamide by Reaction of Benzylated TETA with a Mixture of Dimeric Fatty Acid and Tall Oil Fatty Acid Example 11 utilized the benzylated TETA from example 4. 9.0 g TOFA (0.0315 mole) were charged with 81 g (0.142 mole) of dimeric fatty acid. 202 g benzylated TETA from Example 4 were added. The same process was followed as in Example 10. A total of 6.0 g water was removed. Table 2 lists the AHEW, viscosity, amine value properties and color Gardner of the amido amine.

Example 12

Synthesis of Polyaminoamide by Reaction of Benzylated Example 1 with a Mixture of Dimeric Fatty Acid and Tall Oil Fatty Acid Example 12 utilized the benzylated amine from example 2. 10.0 g TOFA (0.035 mole) were charged with 90 g (0.157 mole) of dimeric fatty acid. 224 g (0.7456 mole) benzylated amine from example 2 was added to the mix. The same process was followed as in Example 10. A total of 5.6 g water was removed. Table 2 lists the AHEW, viscosity, amine value properties and color Gardner of the amido amine.

Example 13

Synthesis of Polyaminoamide by Reaction of Benzylated DETA/TETA with a Mixture of Dimeric Fatty Acid and Tall Oil Fatty Acid Example 13 utilized the benzylated mix of DETA/TETA at a ratio 70/30 from example 5. 130.75 g TOFA (0.4572 mole) were charged with 130.75 g dimeric fatty acid (0.2286 mole). 250.3 g (1.223 moles) of benzylated DETA/TETA from example 5 was added. The same process was followed as in Example 10. A total of 29 g water was removed. Table 2 lists the AHEW, viscosity, amine value properties and color Gardner of the amido amine.

Alkylated Polyamines

In Examples 22-25 alkylated amines were prepared (see Table 5). These Alkylated polyamines were use in the manufacture of amidoamines and polyamides from examples 26 to 31 (See Table 6).

Example 22

Synthesis of Alkylated Example 1 at a Level of 1.2 Moles Acetone Per Mole of Amine (Average)

396.4 g of the polyalkylene product formed in Example 1 (2.25 moles), 2 g of Pd/C and 2 g Pt/C were placed in a 1 liter autoclave reactor. The reactor was sealed and pressure cycled three times each with nitrogen to remove air and three times each with hydrogen to remove the nitrogen. Over a time period of 15 to 20 minutes, 156 g of acetone (2.700 moles) were added to the reactor. After the addition of the acetone was complete, the reactor contents were stirred for an additional 15 minutes or until the reaction was complete, at which time the reaction exotherm began to subside. The vessel was then heated to 60° C. and pressurized to 300 psig (21.4 atm) with hydrogen while stirring at 750-1000 rpm. The temperature was held at 60° C. for 90 minutes and then the temperature and pressure were raised to 120° C. and 800 psig hydrogen for additional 100 minutes to complete the reaction. Reactor was cooled down to 40° C. and then the product was down loaded. The reaction product was filtered to remove the catalyst. Water was removed using a rotary-evaporator operating under 20 mm Hg vacuum and temperatures up to 120° C. The resulting reaction product was a benzylated amine of Example 22, with AHEW, viscosity, amine value properties, as shown in Table 5.

TABLE 2

| Product | | Example 6 | Example 7 | Example 8 | Example 9 |
|---|---|---|---|---|---|
| Amine from example. | | Example 3 | Example 4 | Example 2 | Example 5 |
| Amount TOFA | g | 141.75 | 127.6 | 56.7 | 567 |
| Amount Dimeric FA | g | — | — | — | — |
| Amount amine | g | 362.5 | 205 | 150 | 1450 |
| Amine value | mgKOH/g | 477 | 435 | 501.4 | 538 |
| Amine value of distillate | mgKOH/g | 50 | 74 | 89.1 | 535 |
| Water collected | g | 16.1 | 13.5 | 5.5 | 71.6 |
| Lowest pressure | mmHg | 80 | 80 | 80 | 80 |
| Viscosity at 25° C. | CP @ 25° C. | 54 | 1340 | 164 | 66 |
| Color Gardner | | 11 | 12 | 11 | 12 |
| Imidazoline/amide ratio | | | 1.689 | | |
| HEW | | 97 | 115 | 97 | 88 |
| Induction time | minutes | not needed | Not needed | Not needed | Not needed |
| Gel time @ 25° C. | minutes | 268 | 275.4 | 108 | 116 |

| Product | | Example 10 | Example 11 | Example 12 | Example 13 |
|---|---|---|---|---|---|
| Amine from example. | | Example 3 | Example 4 | Example 2 | Example 5 |
| Amount TOFA | g | 18 | 9 | 10 | 130.75 |
| Amount Dimeric FA | g | 162 | 81 | 90 | 130.75 |
| Amount amine | g | 265.9 | 202 | 224 | 250.3 |
| Amine value | mgKOH/g | 404 | 505 | 470 | 294 |
| Amine value of distillate | mgKOH/g | 17 | 51 | 90 | 502 |
| Water collected | g | 21.3 | 6 | 5.6 | 29 |
| Lowest pressure | mmHg | 760 | 760 | 760 | 80 |
| Viscosity at 25° C. | CP @ 25° C. | 447 | 1700 | 1245 | 781 |
| Color Gardner | | 7 | 5 | 5 | 12 |
| Imidazoline/amide ratio | | to be checked | 0.54 | 0.145 | |
| HEW | | 120 | 100 | 101 | 180 |
| Induction time | minutes | not needed | Not needed | Not needed | Not needed |
| Gel time @ 25° C. | minutes | 300 | 110.3 | 86 | 775 |

Example 23

Synthesis of Alkylated Example 1 at a Level of 1.3 Moles Methyl Ethyl Ketone (MEK) Per Mole of Amine Example 23 utilized the same process as described in example 22, but in this example the polyalkylene component was reacted with MEK. The molar ratio of MEK to Example 1 was 1.3 to 1.0 moles/mole. These reactants ratios are indicated by the degree of 1-methyl propylation in Table 5. Table 5 lists the AHEW, viscosity and amine value properties of the resulting product.

Example 24

Synthesis of Alkylation of Example 1 at a Level of 1.2 Moles Cyclohexanone Per Mole of Amine (Average)

Example 24 utilized the same process as described in example 22, but in this example the polyalkylene component was reacted with cyclohexanone. The molar ratio of cyclohexanone to Example 1 was 1.2 to 1.0 moles/mole. Table 5 lists the AHEW, viscosity and amine value properties of the benzylated DETA.

Example 25

Synthesis of Alkylation of DETA at a Level of 1.2 Moles Acetone Per Mole of Amine (Average)

Example 25 utilized the same process as described in example 22, but in this example the polyalkylene component was DETA (diethylene triamine). The molar ratio of acetone to DETA was 1.2 to 1.0 moles/mole. Table 5 lists the AHEW, viscosity and amine value properties of the benzylated DETA.

TABLE 5

| Product | | Example 22 | Example 23 | Example 24 | Example 25 |
|---|---|---|---|---|---|
| Base amine. | | Example 1 | Example 1 | Example 1 | DETA |
| Alkylator | | Acetone | MEK | Cyclohexanone | acetone |
| Degree of alkylation | | 1.2 | 1.3 | 1.2 | 1.2 |
| HEW | Calculated | 47.2 | 52.9 | 57.2 | 40.9 |
| Amine value | mgKOH/g | 966 | 776.2 | 830 | 978 |
| Viscosity at 25° C. | mPa·s | 18.4 | 16 | 74.2 | 5.22 |
| Color Gardner | | 2 | 1 | 1 | 2-Jan |
| Average Molecular Wgt | Calculated | 227 | 249 | 275 | 156 |

Example 26

Synthesis of Polyamide by reaction of di-isopropylated Example 1 with Tall Oil Fatty Acid and Dimeric Fatty Acid 226.8 g (0.79 mole) TOFA (tall oil fatty acid) is charged in a 700 ml reactor fitted with stirrer, thermocouple and a distillation outlet. The TOFA is heated up to 60° C. 227.2 g of the isopropylated Example 1 (1.0 moles) from example 22 are then added in 30 mins. During the addition an exotherm is observed which brings the temperature to 85° C. The speed of the stirrer is adjusted to 250 rpm, a slow nitrogen flow is allowed to help to remove the water more efficiently. The first water was removed at normal pressure, up to 240° C. When that temperature had been reached it was kept 120 minutes thus. In that time 28.5 g water were collected. The product was cooled down and discharged. The AHEW, viscosity, amine value and Gardner color are shown in Table 6. No vacuum was used as small amounts of imidazoline and tetrahydropyrimidine was formed. The small amount of product was sufficient because the viscosity was already low.

Example 27

Synthesis of Amido Amine by Reaction of the Methyl Ethyl Butylated Example 1 with Tall Oil Fatty Acid Example 27 utilized the MEK/Example 1 from example 23. 186 g TOFA (0.650 mole) were charged with 233.5 g (0.935 moles) of methy ethyl butylated Example 1 from Example 23. The same process was followed as in Example 26. A total of 23.9 g water was removed. The quantity used was to match the usual AHEW value of existing amido amine (ca 115). Table 6 lists the AHEW, viscosity, amine value properties and color Gardner of the amido amine.

Example 28

Synthesis of Polyamide by Reaction of the Methyl Ethyl Butylated Example 1 with Tall Oil Fatty Acid and Dimeric Fatty Acid Example 28 utilized the MEK/Example 1 from example 23. 10 g TOFA (0.035 mole) were charged with 90.0 g (0157 moles) of Dimeric fatty acid. 174.3 g of methyl ethyl butylated Example 1 from Example 23. The same process was followed as in Example 26. A total of 5.4 g water was removed. The quantity used were to match the usual AHEW value of existing amido amine (ca 115). Table 6 lists the AHEW, viscosity, amine value properties and color Gardner of the polyamide.

Example 29

Synthesis of Polyamide by Reaction of the Cyclohexylated Example 1 with Tall Oil Fatty Acid and Dimeric Fatty Acid Example 29 utilized the Cyclohexanone/Example 1 from example 24. 10 g TOFA (0.035 mole) were charged with 90.0 g (0157 moles) of Dimeric fatty acid. 192.5 g of cyclohexylated Example 1 from Example 24. The same process was followed as in Example 26. A total of 7.5 g water was removed. The quantity used was to match the usual AHEW value of existing amido amine (ca 115). Table 6 lists the AHEW, viscosity, amine value properties and color Gardner of the polyamide.

Example 30

Synthesis of Amido Amine by Reaction of Isopropylated DETA with Tall Oil Fatty Acid Example 30 utilized the acetone/diethylene triamine (DETA) from example 25. 255.15 g TOFA (0.892 mole) were charged with 175.5 g (1.125 moles) of isopropylated diethylene triamine from Example 25. The same process was followed as in Example 26. A total of 73.2 g water and amine were removed, the distillate had an amine value of 500 mgKOH/g. The quantity used was to match the usual AHEW value of existing amido amine (ca 115). Table 6 lists the AHEW, viscosity, amine value properties and color Gardner of the amido amine.

Example 31

Synthesis of Polyamide by Reaction of Isopropylated Example 1 with Tall Oil Fatty Acid and Dimeric Fatty Acid Example 31 utilized the acetone/Example 1 from example 22.10 g TOFA (0.035 mole) were charged with 90.0 g (0157 moles) of Dimeric fatty acid. 136.2 g of isopropylated Example 1 from Example 22. The same process was followed as in Example 26. A total of 5.0 g water was removed. The quantity used was to match the usual AHEW value of existing amido amine (ca 115). Table 6 lists the AHEW, viscosity, amine value properties and color Gardner of the polyamide.

Coatings Prepared from Amido Amine and Polyamido Amines Manufactured with Benzylated APEDA-Epoxy Compositions In Examples 14-21, coatings are formed with curing compositions from Examples 6-13.

In Examples 32-37, coatings are formed with curing compositions from Examples 26-31.

Table 3 summarizes the amine-epoxy compositions used in Examples 14-21. For instance, the composition of Example 14 was 33.1 g of EPON® 828 epoxy resin (a bisphenol-A type liquid epoxy resin available from Hexion Specialty chemicals, and 16.9 g of the curing agent composition of Example 6. EPON® is a registered trademark of Hexion Specialty Chemicals, Inc. As indicated in Table 1, Example 1 was a curing agent composition comprising the reaction product of EDA with acrylonitrile followed by reductive hydrogenation. It is noted that Example 1 involved the formation of a polyamine and is consequently not included in Table 1. The curing agents and their respective quantities shown in Examples 14-21 were used as per Tables 3.

Table 7 summarizes the amine-epoxy compositions used in Examples 32-37. For instance, the composition of Example 32 was 29.1 g of EPON® 828 epoxy resin (a bisphenol-A type liquid epoxy resin available from HEXION Specialty chemicals, and 20.9 g of the curing agent composition of Example 26. Example 36 was not carried out due to the extremely long pot-life. The curing agents and their respective quantities shown in Examples 32-37 were used as per Tables 7.

TABLE 6

| PRODUCT # | | Example 26 | Example 27 | Example 28 |
|---|---|---|---|---|
| Alkylated amine used | | Example 22 | Example 23 | Example 23 |
| Type of product | | Amide | Amide | Polyamide |
| TOFA | | 226.8 | 186 | 10 |
| Dimeric fatty acid | | | | 90 |
| amine (Type above table) | | 227.2 | 233.5 | 174.3 |
| Total water collected | | −28.5 | −23.9 | −5.4 |
| AV Product = | mgKOH/g | 397 | 412 | 502 |
| AV distillate = | mgKOH/g | 247 | 388 | 439 |
| Viscosity Product = | cP at 25° C. | 505 | 125 | 516 |
| Color Gardner | | 8 | 8 | 7 |
| Normal Pressure water | g | 28.5 | 23.9 | 5.4 |
| vacuum removed water | g | N/A | N/A | N/A |
| Cold trap | g | 0 | 0 | N/A |
| Total water collected | g | 28.5 | 23.9 | 5.4 |
| Gel time | min | 277 | 332.8 | 203 |
| Imidazoline/Amide Ratio | | 0.615 | 0.659 | 1.504 |
| Induction time | | No | No | Yes |
| HEW | | 136 | 127 | 104 |
| PRODUCT # | | Example 29 | Example 30 | Example 31 |
| Alkylated amine used | | Example 24 | Example 25 | Example 22 |
| Type of product | | Polyamide | Amide | Polyamide |
| TOFA | | 10 | 255.15 | 10 |
| Dimeric fatty acid | | 90 | | 90 |
| amine (Type above table) | | 223.5 | 175.5 | 136.2 |
| Total water collected | | −7.5 | −73.2 | −5 |
| AV Product = | mgKOH/g | 485 | 251 | 510 |
| AV distillate = | mgKOH/g | 35 | 500 | 45 |
| Viscosity Product = | cP at 25° C. | 3450 | 57 | 2670 |
| Color Gardner | | 6 | 10 | 6 |
| Normal Pressure water | g | 7.5 | 73.2 | 5 |
| vacuum removed water | g | N/A | N/A | N/A |
| Cold trap | g | N/A | N/A | N/A |
| Total water collected | g | 7.5 | 73.2 (water + amine) | 5 |
| Gel time | min | 133.3 | >72 hrs | 144.4 |
| Imidazoline/Amide Ratio | | 1 | | 0.459 |
| Induction time | | Yes > 30' | No | Yes > 30' |
| HEW | | 108 | 144 | 106 |

Comparing the viscosities of the new amidoamines or of the polyamido amines curing agents from Table 2 and Table 6 against those from the existing products, we can see that in most cases the viscosities are lower. The use of benzylated or alkylated amines allows us to prepare amides with lower viscosities, which allow the users to use more filler and manufacture inexpensive products. In some other applications it allows a better penetration of the substrate and thereby a better physical adhesion With regard to pot life, the use of benzylated or alkylated amines increases the gel time. The increase depends on the amount of benzylation or alkylation and the amount of amine use in the manufacture of the polyamide.

The other attractive part is the fact that those polyamides do not require an induction time the mix is transparent after the mixing of the two components. This in turn brings gives better finishes as less exudation will take place.

Drying times for the amide-epoxy compositions are summarized in Table 3 and Table 7. The drying time was determined at 23° C. and 65% relative humidity (RH) using a Beck-Koller recorder, in accordance with ASTM D5895, phase 3. The procedure involved coating glass panels with the amide-epoxy compositions at approximately 6 mils wet film thickness. The selection of a coating composition with either a long or short drying time depends upon the requirements of the end-use application. Generally, the results in Table 3 indicated that the coatings of inventive Examples 14 to 21 had various drying times depending on the degree of benzylation used.

TABLE 3

| Products | | Example 14 | Example 15 | Example 16 | Example 17 |
|---|---|---|---|---|---|
| Amide from example. Amounts used | | Example 6 | Example 7 | Example 8 | Example 9 |
| Curing agent | | 16.9 | 18.9 | 18.1 | 18.95 |
| Resin (epon 828) | | 33.1 | 31.1 | 31.9 | 31.05 |
| | | 50 | 50 | 50 | 50 |
| Testing @ 25° C. | | | | | |
| Persoz 1 day | 10' | 186 | 52 | 228 | |
| | 60' | 198 | 114 | 295 | 235 |
| Persoz 3 day | 10' | 324 | 241 | 331 | |
| | 60' | 323 | 268 | 340 | 344 |
| Persoz 7 day | 10' | 358 | 286 | 344 | |
| | 60' | 353 | 323 | 360 | 350 |
| Gloss 1 day | 20° @ 10' | 140 | 114 | 148 | |
| | 60° @ 10' | 145 | 124 | 149 | |
| | 20° @ 60' | 146 | 118 | 144 | 124 |
| | 60° @ 60' | 145 | 127 | 143 | 140 |
| Gloss 3 day | 20° @ 10' | 141 | 116 | 151 | |
| | 60° @ 10' | 144 | 124 | 146 | |
| | 20° @ 60' | 143 | 113 | 142 | 102 |
| | 60° @ 60' | 146 | 127 | 145 | 132 |
| Gloss 7 day | 20° @ 10' | 139 | 116 | 153 | |
| | 60° @ 10' | 145 | 123 | 147 | |
| | 20° @ 60' | 140 | 114 | 143 | 106 |
| | 60° @ 60' | 145 | 126 | 145 | 133 |
| BK recorder (25° C.) | Set-To-touch | 360 | 525 | 240 | 300 |
| (24 Hours strip) | Track Free | 525 | 990 | 330 | 360 |
| | Dry Hard | 750 | 1135 | 465 | 500 |
| | Dry Through | 840 | 1320 | 535 | 700 |
| Products | | Example 18 | Example 19 | Example 20 | Example 21 |
| Amide from example. Amounts used | | Example 10 | Example 11 | Example 12 | Example 13 |
| Curing agent | | 19.4 | 17.2 | 14.55 | 24.3 |
| Resin (epon 828) | | 30.6 | 32.8 | 35.45 | 25.7 |
| | | 50 | 50 | 50 | 50 |
| Testing @ 25° C. | | | | | |
| Persoz 1 day | 10' | 173 | 253 | 70 | |
| | 60' | 225 | 338 | 359 | sticky |
| Persoz 3 day | 10' | 300 | 263 | 137 | |
| | 60' | 338 | 369 | 368 | 247 |
| Persoz 7 day | 10' | 333 | 263 | 229 | |
| | 60' | 364 | 380 | 338 | 247 |
| Gloss 1 day | 20° @ 10' | 141 | 152 | 150 | |
| | 60° @ 10' | 142 | 146 | 140 | |
| | 20° @ 60' | 115 | 173 | 178 | sticky |
| | 60° @ 60' | 131 | 148 | 151 | sticky |
| Gloss 3 day | 20° @ 10' | 141 | 151 | 150 | |
| | 60° @ 10' | 142 | 147 | 141 | |
| | 20° @ 60' | 107 | 173 | 183 | 171 |
| | 60° @ 60' | 128 | 148 | 152 | 148 |

TABLE 3-continued

| | | | | | |
|---|---|---|---|---|---|
| Gloss 7 day | 20° @ 10' | 141 | 150 | 148 | |
| | 60° @ 10' | 140 | 146 | 140 | |
| | 20° @ 60' | 111 | 172 | 183 | 172 |
| | 60° @ 60' | 129 | 149 | 153 | 147 |
| BK recorder (25° C.) | Set-To-touch | 480 | 235 | 205 | 1080 |
| (24 Hours strip) | Track Free | 660 | 355 | 315 | 1570 |
| | Dry Hard | 835 | 415 | 375 | 1680 |
| | Dry Through | 1135 | 690 | 570 | 1845 |

Hardness development by the Persoz pendulum hardness method. Table 3 lists the Persoz Hardness test results after 1 day, 3 days, and 7 days, respectively, at 23° C. and 50% RH. Coatings were applied to glass panels at a wet film thickness of about 8 mils and tested in accordance with ISO 1522. As shown in Table 3, the formulations of inventive Examples 14 to 21 having been manufactured with benzylated amine had developed a high Persoz after 7 days.

Additionally, the coatings of inventive Examples 14 to 21 had much faster hardness development than the existing products shown on Table 4.

Table 3 lists the 20° Gloss test results after 1 day, 3 days, and 7 days, respectively, at 23° C. and 50% RH. Results shown are the average of 10 measurements. Coatings were applied to glass panels at a wet film thickness of about 8 mils and tested in accordance with ASTM D523. The gloss was measured at an angle of 20° using a Gardner gloss meter. Measurements were made with the glass panel placed on a black cardboard background. As shown in Table 3, each of the formulations of inventive Examples had a high gloss value; this is principally due to the good miscibility of the curing agent with the resin.

The results in Table 7 show that the alkylated amine based products do not have the same properties as those based on the benzylated amine. While not wishing to be bound by theory, it is believed that this difference results from a certain lack of miscibility with the resin.

TABLE 7

| Products | | Example 32 | Example 33 | Example 34 |
|---|---|---|---|---|
| Amide from example. Amounts used | | Example 26 | Example 27 | Example 28 |
| Curing agent | | 20.9 | 20 | 17.7 |
| Resin (Epon 828) | | 29.1 | 30 | 32.3 |
| | | 50 | 50 | 50 |
| Testing @ 25° C. | | | | |
| Persoz 1 day | 10' | sticky | | sticky |
| | 60' | 31 | | 153 |
| Persoz 3 day | 10' | soft | | soft |
| | 60' | 139 | | 151 |
| Persoz 7 day | 10' | soft | soft | soft |
| | 60' | 167 | 152 | 100 |
| Gloss 1 day | 20° @ 10' | sticky | | sticky |
| | 60° @ 10' | sticky | | sticky |
| | 20° @ 60' | 157 | | 158 |
| | 60° @ 60' | 142 | | 142 |
| Gloss 3 day | 20° @ 10' | soft | | soft |
| | 60° @ 10' | soft | | soft |
| | 20° @ 60' | 155 | | 155 |
| | 60° @ 60' | 142 | | 141 |
| Gloss 7 day | 20° @ 10' | soft | soft | soft |
| | 60° @ 10' | soft | soft | soft |
| | 20° @ 60' | 150 | 167 | 131 |
| | 60° @ 60' | 140 | 144 | 134 |

TABLE 7-continued

| | | | | |
|---|---|---|---|---|
| BK recorder (25° C.) (24 Hours strip) | Set-To-touch | 635 | 915 | 450 |
| | Track Free | 915 | 1080 | >24 hrs |
| | Dry Hard | >24 hrs | >24 hrs | |
| | Dry Through | | | |

| Products | | Example 35 | Example 36 | Example 37 |
|---|---|---|---|---|
| Amide from example. Amounts used | | Example 29 | Example 30 | Example 31 |
| Curing agent | | 18.1 | 22.8 | 17.9 |
| Resin (Epon 828) | | 31.9 | 27.2 | 32.1 |
| | | 50 | 50 | 50 |
| Testing @ 25° C. | | | | |
| Persoz 1 day | 10' | sticky | | |
| | 60' | 136 | | |
| Persoz 3 day | 10' | soft | Too long pot life for application | Too small amount after a couples of pot-lives |
| | 60' | 150 | | |
| Persoz 7 day | 10' | soft | | |
| | 60' | 179 | | |
| Gloss 1 day | 20° @ 10' | sticky | | |
| | 60° @ 10' | sticky | | |
| | 20° @ 60' | 111 | | |
| | 60° @ 60' | 123 | | |
| Gloss 3 day | 20° @ 10' | soft | | |
| | 60° @ 10' | soft | | |
| | 20° @ 60' | 108 | | |
| | 60° @ 60' | 120 | | |
| Gloss 7 day | 20° @ 10' | soft | | |
| | 60° @ 10' | soft | | |
| | 20° @ 60' | 105 | | |
| | 60° @ 60' | 119 | | |
| BK recorder (25° C.) (24 Hours strip) | Set-To-touch | 265 | | |
| | Track Free | 360 | | |
| | Dry Hard | >24 hrs | | |
| | Dry Through | | | |

The products formed show a long pot life which will be useful for large castings and moldings. The epoxy reaction is an exothermic reaction. Large amount of heat are evolved in fast cure. The long cure experienced with these products will assist the manufacture of large castings as the heat of reaction will be evolved over a longer time and will have time to disperse.

In the Table 4 attached below we show some of our commercial existing products. On those products we can see that all of them require an induction time. The properties of the films vary widely with the time of application (10 or 60 minutes). The hardness develops to a good level after seven days cure at RT when applied after 60 minutes, however the systems applied after 10 minutes show poor results.

TABLE 4

|  |  | Products | | | | |
| --- | --- | --- | --- | --- | --- | --- |
|  |  | Ancamide 500 Amido amine | Ancamide 503 Amido amine | Ancamide 506 Amidoamine | Ancamide 350A Polyamide | Ancamide 260A polyamide |
| Amine value | mgKOH/g | 445 | 500 | 420 | 380 | 350 |
| Viscosity @25° C. | cp @ 25° C. | 250 | 350 | 250 | 11000 | 40000 |
| Color Gardner |  | 7 | 6 | 7 | 7 | 7 |
| HEW |  | 90 | 90 | 105 | 100 | 120 |
| Loading (phr) | g | 50 | 50 | 55 | 55 | 65 |
| Geltime (150 g) | mins | 135 | 70 | 385 | 200 | 120 |
| Induction time |  | Yes | Yes | Yes | Yes | Yes |
|  |  | Amounts used | | | | |
|  |  | Ancamide 500 | Ancamide 503 | Ancamide 506 | Ancamide 350A | Ancamide 260A |
| Curing agent |  | 16.7 | 16.7 | 17.7 | 17.7 | 19.7 |
| Resin (epon 828) |  | 33.3 | 33.3 | 32.3 | 32.3 | 30.3 |
|  |  | 50 | 50 | 50 | 50 | 50 |
| Testing @ 25° C. |  |  |  |  |  |  |
| Persoz 1 day | 10' | 43 | 43 | 29 | 16 | 53 |
|  | 60' | 121 | 182 | 58 | 30 | 71 |
| Persoz 3 day | 10' | 94 | 64 | 59 | 23 | 20 |
|  | 60' | 204 | 286 | 179 | 64 | 247 |
| Persoz 7 day | 10' | 96 | 52 | 73 | 67 | 30 |
|  | 60' | 248 | 239 | 223 | 138 | 295 |
| Gloss 1 day | 20° @ 10' | 16 | 15 | 32 | 18 | 100 |
|  | 60° @ 10' | 42 | 44 | 74 | 54 | 120 |
|  | 20° @ 60' | 33 | 51 | 52 | 25 | 91 |
|  | 60° @ 60' | 61 | 76 | 94 | 68 | 113 |
| Gloss 3 day | 20° @ 10' | 14 | 14 | 30 | 18 | 89 |
|  | 60° @ 10' | 40 | 40 | 70 | 56 | 117 |
|  | 20° @ 60' | 30 | 44 | 90 | 19 | 56 |
|  | 60° @ 60' | 63 | 71 | 82 | 60 | 97 |
| Gloss 7 day | 20° @ 10' | 13 | 12 | 23 | 75 | 15 |
|  | 60° @ 10' | 39 | 36 | 75 | 110 | 53 |
|  | 20° @ 60' | 25 | 50 | 53 | 14 | 58 |
|  | 60° @ 60' | 60 | 69 | 89 | 52 | 99 |
| BK recorder (25° C.) |  |  |  |  |  |  |
| (24 Hours strip) | Set-To-touch | 300 | 195 | 420 | 100 | 180 |
|  | Track Free | 430 | 300 | 735 | 1020 | 330 |
|  | Dry Hard | 620 | 455 | 1140 | >24 hrs | 450 |
|  | Dry Through | 1020 | 600 | 1320 |  | 630 |
| Appearance |  | orange peel rough surface | orange peel rough surface | orange peel rough surface | opaque craters | oily opaque |

With regard to the gloss results shown in Table 4, the results are much less desirable than those obtained with the products of the disclosure.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A polyamide curing agent composition comprising the reaction product of:

(1) an amine component comprising at least one compound having formula selected from the group consisting of:

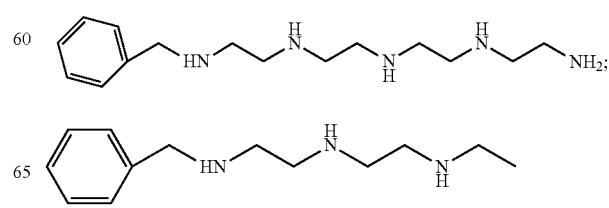

-continued

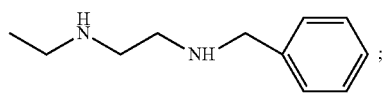

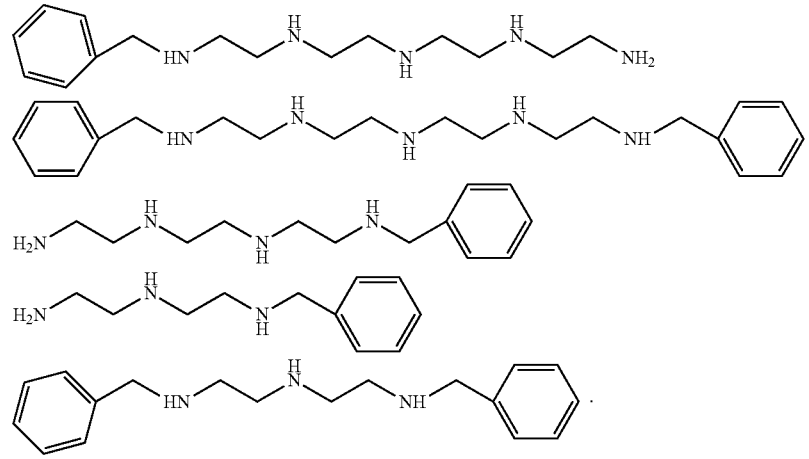

-continued

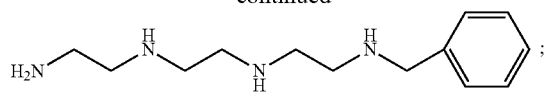

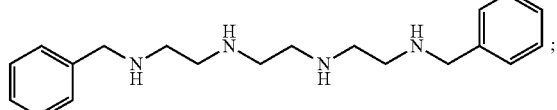

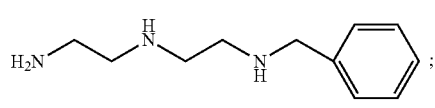

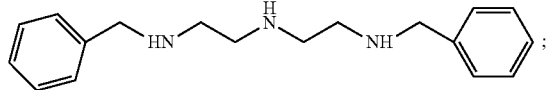

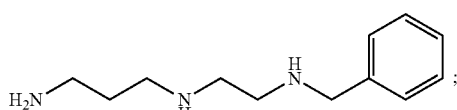

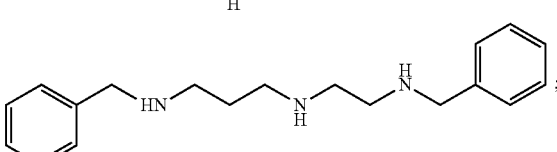

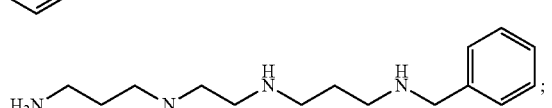

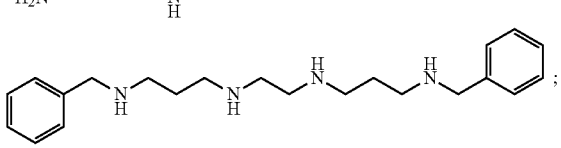

and combinations thereof; and (2) a fatty acid component.

2. The composition of claim 1, wherein the fatty acid component is selected from the group consisting of monomer fatty acids, dimer fatty acids, trimer fatty acids, polymer fatty acids, esters of monomer, dimer, trimer, and polymer fatty acids and combinations thereof.

3. The composition of claim 1, wherein the amine component comprises:

4. The composition of claim 1, wherein the fatty acid component comprises a monofunctional fatty acid.

5. The composition of claim 1, wherein the fatty acid component comprises $C_8$ to $C_{22}$ mono-carboxylic acids containing from 0 to about 4 units of unsaturation.

6. The composition of claim 1, wherein the fatty acid component comprises $C_{16}$ to $C_{22}$ mono-carboxylic acids containing from 0 to about 4 units of unsaturation.

7. An amine-epoxy composition comprising the reaction product of:
  (1) a curing agent composition of claim 1; and
  (2) an epoxy composition comprising at least one multifunctional epoxy resin.

8. The composition of claim 7, wherein the epoxy composition is selected from the group consisting of diglycidyl ethers of bisphenol-A, advanced diglycidyl ethers of bisphenol-A, diglycidyl ethers of bisphenol-F, epoxy novolac resins and combinations thereof.

9. A polyamide curing agent composition comprising the reaction product of:
  an amine component comprising at least one benzylated amine, the amine comprising at least one component having the following structure:

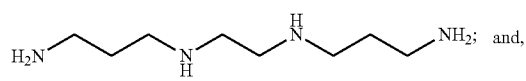

(2) a fatty acid component.

10. A polyamide curing agent comprising the reaction product of:
  (1) an amine component comprising at least one member selected from the group of benzylated diethylenetriamine, benzylated triethylenetetramine, benzylated tetraethylenepentamine, benzylated pentaethylenehexamine, benzylated hexaethyleneheptamine, benzylated aminopropyl ethylenediamine and combinations thereof; and, (2) a fatty acid component.

11. The composition of claim 1 further comprising at least one of a carboxylic acid and a multifunctional amine.

12. The composition of claim 11 wherein the amine comprises at least one of a benzylated or alkylated amine.

13. The composition of claim 1 further comprising at least one member selected from the group consisting of diethylenetriamine (DETA), triethylenetetramine (TETA), teraethylenepentamine (TEPA), pentaethylenehexamine (PEHA), hexamethylenediamine (HMDA), N-(2-aminoethyl)-1,3-propanediamine (N₃-Amine), N,N'-1,2-ethanediylbis-1,3-propanediamine (N₄-amine), dipropylenetriamine; m-xylylenediamine (mXDA), p-xylylenediamine; 1,3-bisaminocyclohexylamine (1,3-BAC), isophorone diamine (IPDA), 4,4'-methylenebiscyclohexanamine; m-phenylenediamine, diaminodiphenylmethane (DDM), diaminodiphenylsulfone (DDS); N-aminoethylpiperazine (NAEP), 3,9-bis(3-aminopropyl)2,4,8,10-tetraoxaspiro (5,5)undecane; oxy-1,2-butylene, oxy-1,4-butylene; 4,7-dioxadecane-1,10-diamine, 1-propanamine, 3,3'-(oxybis(2,1-ethanediyloxy)), bis(diaminopropylated diethylene glycol, poly(oxy(methyl-1,2-ethanediyl)), alpha-(2-aminomethylethyl), omega-(2-aminomethylethoxy), triethyleneglycoldiamine, poly(oxy(methyl-1,2-ethanediyl)), alpha,alpha'-(oxydi-2,1-ethanediyl)bis(omega-(aminomethylethoxy)), bis(3-aminopropyl)polytetrahydrofuran 350, bis(3-aminopropyl)polytetrahydrofuran 750, poly(oxy(methyl-1,2-ethanediyl)), and diaminopropyl dipropylene glycol.

14. The composition of claim 1 further comprising at least one member selected from the group consisting of 1,3-bisaminocyclohexylamine (1,3-BAC), N-aminoethylpiperazine (NAEP), 4,7-dioxadecane-1,10-diamine,1-propanamine,3,3'-(oxybis(2,1-ethanediyloxy))bis-, poly(oxy(methyl-1,2-ethanediyl)), alpha-(2-aminomethylethyl) omega-(2-aminomethylethoxy, triethylene glycol diamine, and poly(oxy(methyl-1,2-ethanediyl))alpha, and alpha'-(oxy(di-2,1-ethanediyl))bis (omega-(aminomethylethoxy)).

15. The composition of claim 1 wherein the fatty acid component is combined with an epoxy resin.

16. The composition of claim 15 wherein the epoxy resin comprises a polyepoxy compound containing at least two 1,2-epoxy groups per molecule.

17. The composition of claim 16 wherein the polyepoxy compound comprises at least one member selected from the group consisting of diglycidyl ethers of bisphenol-A, diglycidyl ethers of bisphenol-F, and epoxy novolac resins.

18. The composition of claim 1 further comprising at least one member selected from the group consisting of styrene oxide, cyclohexene oxide, glycidyl ethers of phenol, cresols, tert-butylphenol, butanol, 2-ethyl-hexanol and C8 to C14 alcohols.

19. The composition of claim 1 further comprising at least one accelerator selected from the group consisting of organic acids, alcohols, phenols, tertiary amines, hydroxylamines, benzyl alcohol, phenol, nonylphenol, octylphenol, t-butylphenol, cresol, bisphenol-A, salicylic acid, dimethylaminomethylphenol, bis(dimethylaminomethyl)phenol, and tris(dimethylaminomethyl)phenol.

20. The composition of claim 1 further comprising at least one plasticizer selected from the group consisting of benzyl alcohol, nonylphenol, esters of phthalic acid, toluene-formaldehyde condensates, xylene-formaldehyde condensates, and coumarone-indene resins.

21. The composition of claim 1 further comprising at least one member selected from the group consisting of solvents, fillers, pigments, pigment dispersing agents, rheology modifiers, thixotropes, flow and leveling aids, defoamers, accelerators, plasticizers, fibers, surfactants, defoamers, and biocides.

22. The composition of claim 1 wherein the solvent comprises at least one member selected from the group consisting of aromatics, aliphatics, esters, ketones, ethers, alcohols, glycols, glycol ethers, acetone, methyl ethyl ketone, methyl isoamyl ketone, methyl propyl ketone, methyl amyl ketone, and diacetone alcohol.

23. The composition of claim 1 wherein the composition comprises the benzylated product of at least one of N-3-aminopropyl ethylenediamine, N,N'-bis(3-aminopropyl)ethylenediamine, and N,N,N'-tris(3-aminopropyl)ethylenediamine.

24. The composition of claim 1 wherein the amine component comprises:

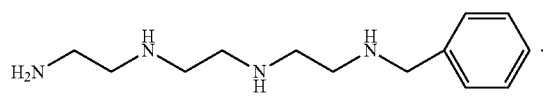

25. The composition of claim 1 wherein the amine component comprises:

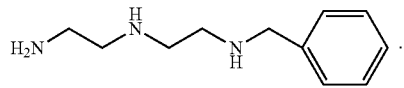

26. The composition of claim 1 wherein the amine component comprises:

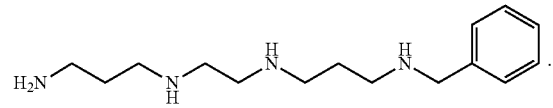 [SMILES: NCCCNCCNCCCNCc1ccccc1 ; "."]

27. The composition of claim 10, wherein the amine component is selected from the group consisting of benzylated diethylenetriamine, benzylated triethylenetetramine, benzylated aminopropyl ethylenediamine and combinations thereof.

28. The composition of claim 10, wherein the amine component is selected from the group consisting of benzylated tetraethylenepentamine, benzylated pentaethylenehexamine, benzylated hexaethyleneheptamine, and combinations thereof.

* * * * *